United States Patent [19]
Hidaka

[11] Patent Number: 5,671,380
[45] Date of Patent: Sep. 23, 1997

[54] METHOD AND APPARATUS FOR CREATING A GRAPHIC USING GRAPHIC ICONS

[75] Inventor: Kazuyoshi Hidaka, Yokohama, Japan

[73] Assignee: International Business Machines Corporation, Armonk, N.Y.

[21] Appl. No.: 970,513

[22] Filed: Nov. 2, 1992

[30]   Foreign Application Priority Data

Nov. 21, 1991   [JP]   Japan ..................... 3-331520

[51] Int. Cl.$^6$ .......................................... G06F 3/14
[52] U.S. Cl. ............................. 395/348; 395/977
[58] Field of Search ..................... 395/159, 152, 395/156, 141, 142, 143, 140, 348, 339, 977, 326, 352, 354; 345/121, 122, 127, 130

[56]            References Cited

U.S. PATENT DOCUMENTS

| | | | |
|---|---|---|---|
| 4,698,625 | 10/1987 | McCaskill et al. | 345/157 |
| 4,813,013 | 3/1989 | Dunn | 395/333 |
| 4,875,173 | 10/1989 | Nakajima | 395/138 X |
| 5,237,647 | 8/1993 | Roberts et al. | 395/119 |
| 5,299,307 | 3/1994 | Young | 395/339 |
| 5,365,360 | 11/1994 | Torres | 395/348 |
| 5,371,845 | 12/1994 | Newell et al. | 395/347 |
| 5,479,602 | 12/1995 | Baecker et al. | 395/349 |
| 5,586,237 | 12/1996 | Baecker et al. | 395/348 X |

FOREIGN PATENT DOCUMENTS 2-277127   11/1990   Japan .

OTHER PUBLICATIONS

Microsoft Windows Graphical Environment User's Guide, ver. 3.0, "Paintbrush", Microsoft Corporation, 1990, pp. 263–271, 278–295.

Baecker et al., "Brining Icons to Life", Proceedings of the CHI '91, Apr. 27–May 2, 1991, pp. 1–6. 1991.

Primary Examiner—Raymond J. Bayerl
Assistant Examiner—Crescelle N. dela Torre
Attorney, Agent, or Firm—Jeffrey S. LaBaw

[57]   ABSTRACT

A method to easily draw a graphic having many control points using graphical icons. The control points necessary for defining a graphic are displayed on an icon display screen together with a graphical icon. Information on the operation sequence for the control points is also displayed on the screen by blinking the control points. The state of the control points specified by the user is displayed in the form of animation by a control-point moving and displaying apparatus and is displayed on a graphical display screen in the form of drawing points. When a user draws a graphic, he or she can quickly and clearly tell which points at which positions of a graphic should be specified in what sequence, and the present step of the drawing process.

11 Claims, 9 Drawing Sheets

| Object number | Type | Attribute | Control point |
|---|---|---|---|
| 1 | Line segment | style-1 | $(X_{11},Y_{11})$ $(X_{12},Y_{12})$ |
| 2 | Circle | style-2 | $(X_{21},Y_{21})$ $(X_{22},Y_{22})$ |
| ... | ... | ... | ... |
| h | type-h | style-h | $(X_{h1},Y_{h1})$ $(X_{h2},Y_{h2})$ ••• |
| ... | ... | ... | ... |

FIG. 4

| Icon number | Type | Control point |
|---|---|---|
| 1 | Line segment | $(x_{11},y_{11})$ $(x_{12},y_{12})$ |
| 2 | Circle | $(x_{21},y_{21})$ $(x_{22},y_{22})$ |
| 3 | Square | $(x_{31},y_{31})$ $(x_{32},y_{32})$ ••• |
| ... | ... | ... |
| k | type-k | $(x_{k1},y_{k1})$ $(x_{k2},y_{k2})$ $(x_{k3},y_{k3})$ |
| ... | ... | ... |

PRIOR ART

FIG. 10B

PRIOR ART

FIG. 10C

PRIOR ART

FIG. 10D

PRIOR ART

FIG. 10E

PRIOR ART

METHOD AND APPARATUS FOR CREATING A GRAPHIC USING GRAPHIC ICONS

BACKGROUND OF THE INVENTION

1. Field of the Invention

This invention relates to a method and an apparatus for creating a graphic using graphical icons.

2. Prior Art

Graphical devices in which a graphic is created by a user directly specifying points on a display screen of a computer with a mouse are known. Also, other known graphical devices create a graphic by selecting graphical icons and a menu of words or characters.

The method of creating a graphic with a "rubber band" is known as one of the methods for using graphical icons. In this method, a rubber band is used to draw, for example, a circular arc, the user can confirm the shape of the circular arc being drawn directly on the screen. However, the central angle of the circular arc is predetermined to be 90° when drawing it. Therefore, to change the 90° angle to another angle requires another separate operation. The method for creating a graphic with a rubber band is not suited for creating of a graphic with many control points.

Another method using graphical icons is disclosed in the official gazette of PUPA No. 2-277127, wherein a drawing method in which a graphic is created by selecting an icon in an edit icon menu area and an edit instruction in an edit instruction menu area through mouse operation and further specifying a point in an edit area. In this method, operation is difficult unless the user is familiar with the details of icon operations. To create a circular arc, for example, the system requests an operation for specifying definition of points for three predetermined positions in a predetermined sequence. However, unless the user is familiar with the predetermined operation sequence, there is a problem in that he or she cannot determine which positions on the circular arc should be specified nor in which sequence they should be specified.

Also, for a prior art method using a menu of words or characters, the operation is difficult unless the user is familiar with the contents of the menu. Therefore, there is no conventional graphic drawing method known to the applicant whereby a graphic consisting of a plurality of control points is easily created.

SUMMARY OF THE INVENTION

It is an object of this invention to provide a method in which anyone can easily create a graphic having many control points using graphical icons.

This and other objects, features and advantages are accomplished by a method which creates a graphic with one of a plurality of graphical icons, arranged so that the control points necessary for defining the graphic are displayed on a graphical display screen together with the graphical icons as well as information on the procedure for manipulating the control points. This enables the user to easily and clearly understand which points at which positions of the graphical icon should be specified in what sequence, and the present step of the graphic creation process.

The present invention makes it possible to show a user the graphical drawing process using graphic icons and to briefly and clearly indicate the present step of the drawing process.

DETAILED DESCRIPTION OF THE DRAWINGS

Figure 1:
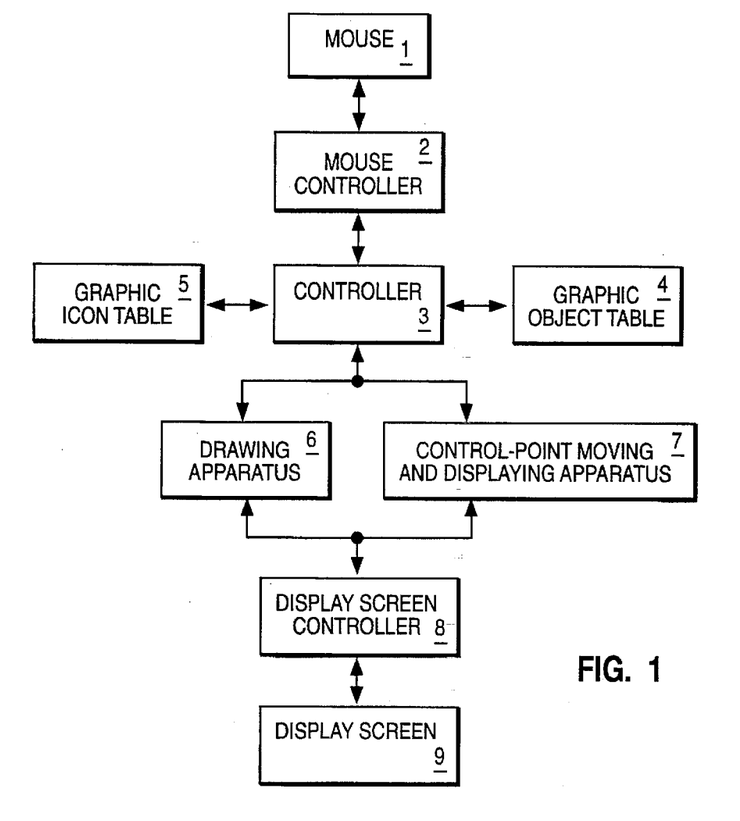
FIG. 1 shows a general block diagram of the graphical drawing apparatus which is an embodiment of the present invention.

FIG. 1 show a general block diagram of the graphic creating apparatus which is an embodiment of the present invention. A mouse 1 is the means for inputting operation commands and data, and a mouse controller 2 is used for detecting a pointing operation by the mouse. A controller 3 includes a microprocessor and memories and processes a graphic in accordance with method of the Applicant, which will be mentioned later, based on the inputted operation commands and data. A graphical object table 4 holds the data for the graphic to be drawn. A graphical icon table 5 holds the data for graphical icons. A drawing apparatus 6 is used for drawing commands, icons, and graphics on a display screen 9 based on the processing by the controller 3. A control-point moving and displaying apparatus 7 displays or animates the state of specification of the control points of graphical icons. A display screen controller 8 controls the display screen 9 based on the outputs of the drawing apparatus 6 and the control-point moving and displaying apparatus 7.

Figure 2:
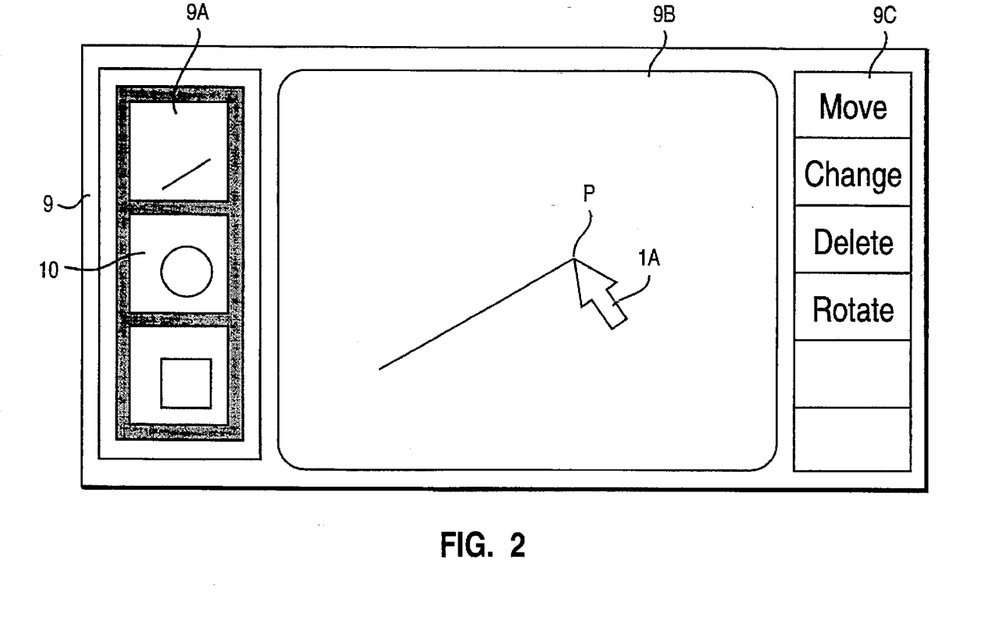
FIG. 2 shows a defining of the display screen in FIG. 1.

FIG. 2 shows an arrangement of the display screen 9 in FIG. 1. The display screen 9 has an icon menu area 9A, a drawing area 9B, and a command area 9C. Various graphical icons 10 including line segments, circles, and rectangles are displayed in the icon menu area 9A. A mouse cursor 1A is placed on one of the graphical icons, which is in turn selected by clicking the mouse 1. A graphic corresponding to the selected graphical icon is created by specifying an operation command in the command area 9C, as required, and specifying a drawing point P in the drawing area 9B by the mouse 1.

Figure 3A:
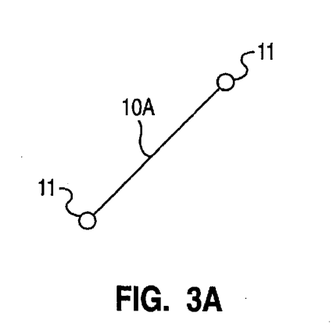
FIG. 3 shows graphical icons and their control points.
Figure 3B:
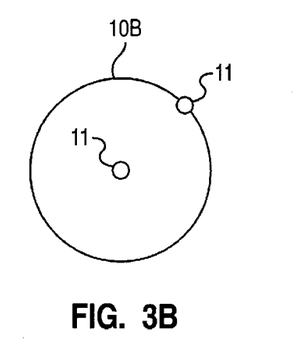
Figure 3C:
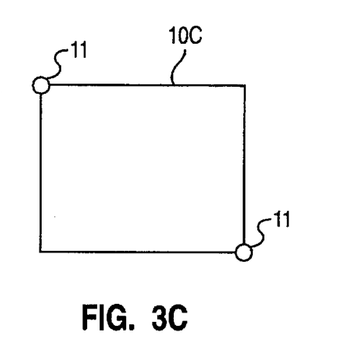

Each graphical icon 10 has several control points 11. A particular number of points on a two-dimensional plane are necessary and adequate for defining each graphic, e.g., two points at both ends of the line segment 10A in FIG. 3 (A), or two points one at the center of a circle and one at the circumference of the circle or three points on the circumference of the circle 10B in FIG. 3 (B), or two apexes on the diagonal line of the rectangle in FIG. 3(C) serve as the control prints 11. The control points 11 are displayed as in a special graphical icon or symbol such as a circle or quadrangle so that they can be easily identified by the user.

Figure 4:
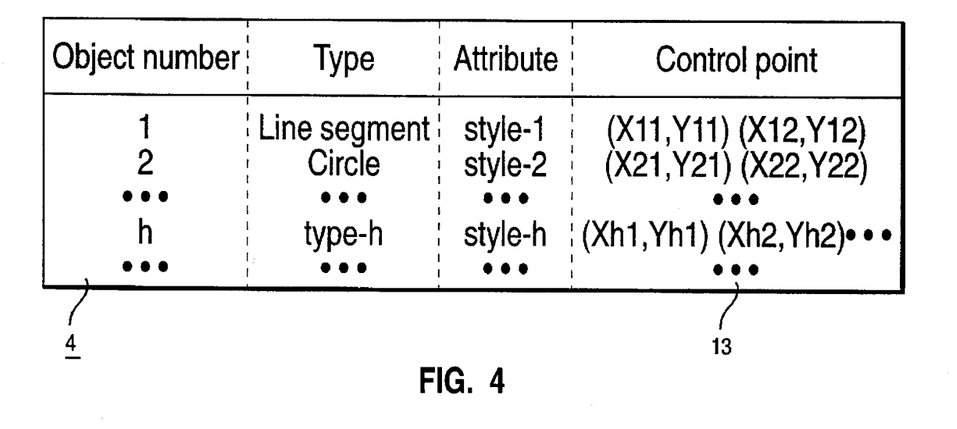
FIG. 4 shows the data structure of a graphical object table.

Data for the process and results of graphical creation in the drawing area 9B are recorded in the graphical object table 4. That is, the number, type (e.g., line segment or circle), and attributes (e.g., thick or thin line) of each graphical object and the data for each graphic are entered in the table as shown in FIG. 4. The control points 12 correspond to the control points 11 of the graphical icon 10. The data 13 for the control points 12 indicate the positions (Xh1, Yh1, Xh2, Yh2, . . . ) of the drawing points P in the drawing area 9B using the common X-Y coordinates on the display screen 9.

Figure 5:
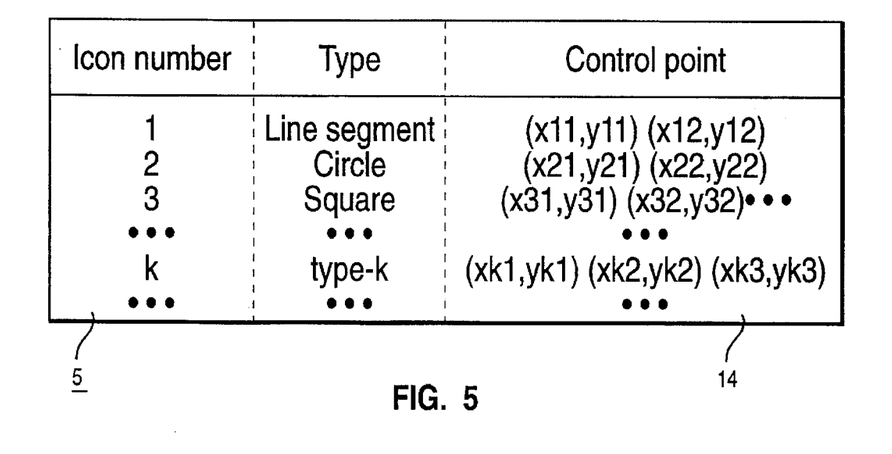
FIG. 5 shows the data structure of a graphical icon table.

As shown in FIG. 5, the data for all graphical icons to be displayed on the screen, that is, the data for the icon number, type of graphic, and control points 11, are entered in the graphical icon table 5. The data 14 for the control points 11 indicate the positions (xk1, yk1, xk2, yk2, . . . ) of the control points 11 in the icon menu area 9A using the common X-Y coordinates on the display screen 9. The control points which are necessary and adequate for defining a graphic are arranged in the graphical icon table 5 in the sequence of operation.

Figure 6:
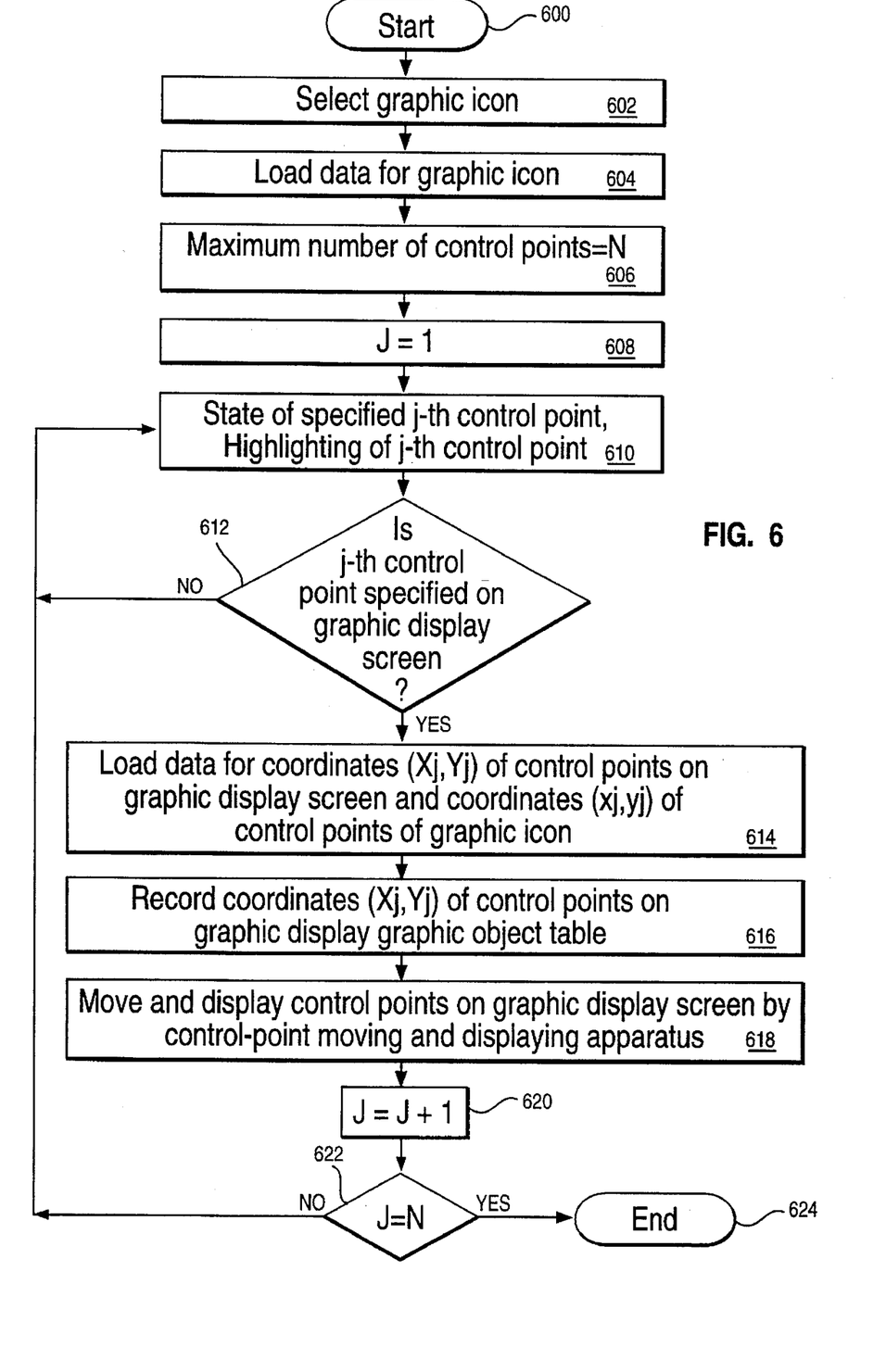
FIG. 6 shows a general operation flow of the graphical drawing apparatus in FIG. 1.

FIG. 6 shows the operation flow of the controller 3. A plurality of graphical icons 10 held in the graphical icon table 5 are displayed together with their control points 11 in the icon menu area 9A on the display screen 9 through the drawing apparatus 6 and the display screen controller 8. When the user selects one of the displayed graphical icons 10 with the mouse 1, the selected operation is detected by the mouse controller 2 and transferred to the controller 3 (Step 602). As a result, the graphical icon table 5 is referenced, the data for the graphical icon 10 selected by the user is loaded in the controller 3 (Step 604), and the number of control points N and the operation sequence for the control points are obtained (Step 606). This graphical icon is displayed in reverse video in the icon menu area 9A and the first control point 11 to be positioned by the user is highlighted in a different color or by blinking (Step 610). The highlighted points are processed by the drawing apparatus 6 and the display screen controller 8 in accordance with the outputs of the controller 3.

Then, when the user specifies a drawing point P on the display screen 9B with the mouse 1, the point is detected as a control point (Step 612). Thus, whenever a j-th control point is specified: the coordinates (Xj, Yj) of the control point 12 of the graphical and the coordinates (xj, yj) of the control point 11 in the icon menu area 9A on the display screen 9B are obtained (Step 614); the coordinates of the control points are sequentially entered in the graphic object table 4 (Step 616); the control point currently highlighted on the graphical icon 10, that is, the control point 11 whose drawing position P was determined, is deleted; the same graphic as the control point 11 is blinked while moving it, in other words, while moving it in the form of animation from the location of the control point 11 of the graphical icon 10 to the drawing point P on the display screen 9B specified by the mouse 1; and the control point 12 is displayed at the specified drawing point P (Step 618).

Then, the "j=j+1-th" control point 11 that is to be determined next by the user based on the data for the graphical icon 10 is highlighted on the graphical icon 10 (Step 610).

The above operation is repeated for the number of control points N of the selected graphical icon.

Description of the commands used for drawing and display and processing of graphical icons is omitted because they are the same as those for a normal graphical processor (for example, see the official gazette of PUPA No. 2-277127).

Figure 7:
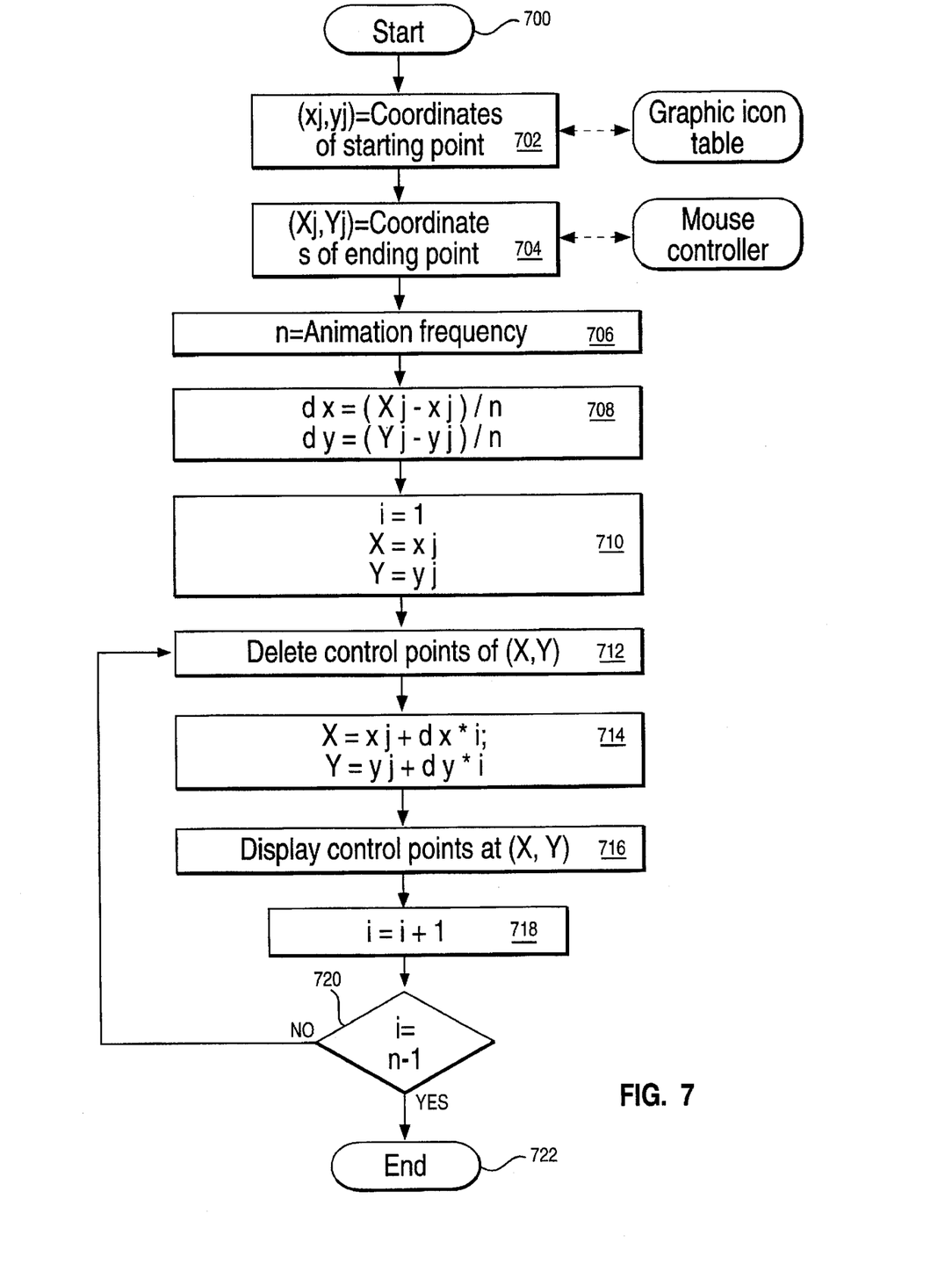
FIG. 7 shows a general operation flow of the control-point moving and displaying apparatus in FIG. 1.

The animations in Step 618 are processed by the control-point moving and displaying apparatus 7 based on the graphical icon table 5 and the detected coordinates of the mouse 1. FIG. 7 shows the operation flow chart of the control-point moving and displaying apparatus 7.

First, the coordinates (xj, yj) of the starting point are obtained from the graphical icon table 5 (Step 702), and then the coordinates (Xj, Yj) of the ending point are obtained through the mouse controller 2 (Step 704).

By assuming "n" to be the animation frequency (Step 706), "dx, dy" is obtained by equally dividing the difference between the coordinates (xj, yj) of the starting point and the coordinates (Xj, Yj) of the ending point by "n" (Step 708). Then, the control-point display positions are successively moved from the starting point to the ending point by the amount "dx, dy" (Steps 710 through 720).

The creating operation of the present invention is described below in the case in which a square is drawn. In this case, it is assumed that the square has two control points, one at each bottom apex.

FIG. 8 shows the state transitions for drawing a square as the transitions on the screen corresponding to each operation step. All operations necessary for drawing a square are completed in three mouse operations by the user, that is, as selection of the square icon 10C, specification of the starting point (control point) of the square, and specification of the ending point (control point) of the square.

Figure 8A:
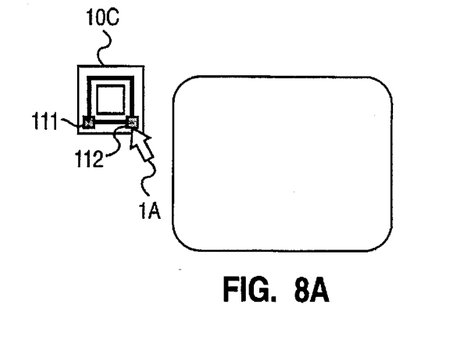
FIG. 8 shows the state transitions of the operation for drawing a square by the method of the present invention.
Figure 8B:
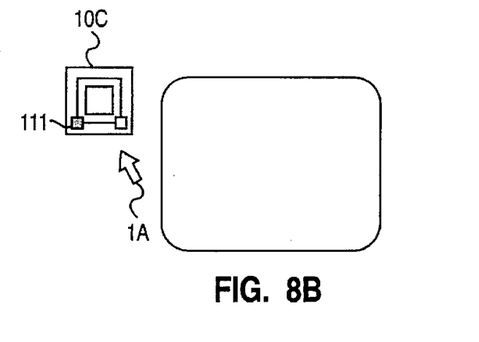

The two control points 111 and 112 to be specified are displayed on the square icon in FIG. 8(A). The user knows that he or she should specify the two points at each bottom end in order to draw a square. When the starting-point specification state is entered into after specifying the square icon, the whole square icon 10C is shown in reverse video as shown in FIG. 8(B) to indicate that the starting-point specification state is ready. At this time, the control point 111 to be specified next is highlighted by coloring it so that it is differentiated from the other control points. Therefore, the user can easily find the control point to be next specified on the graphical icon.

Figure 8C:
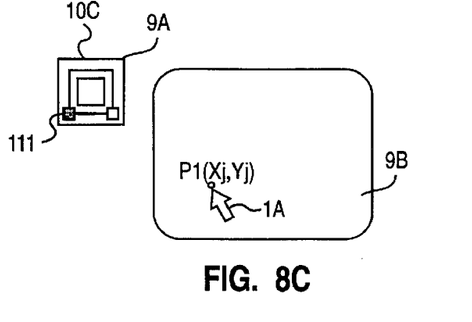
Figure 8D:
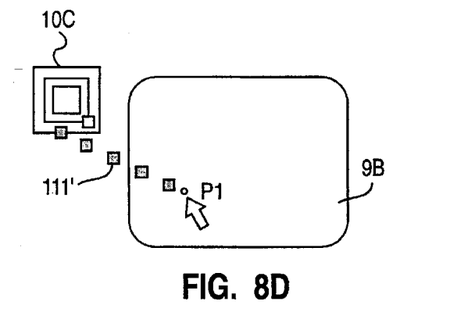
Figure 8E:
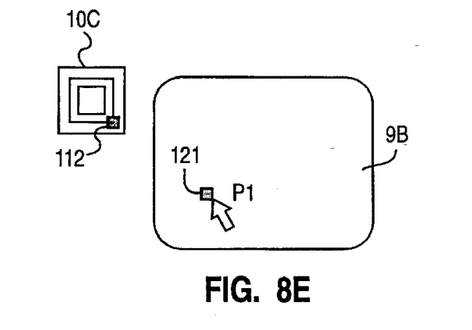
Figure 8F:
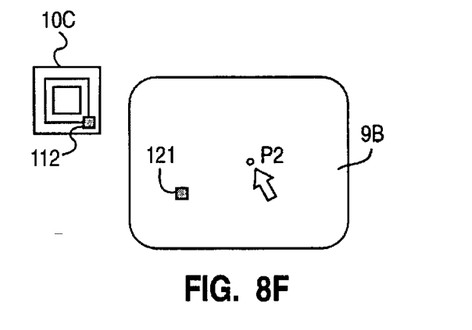
Figure 8G:
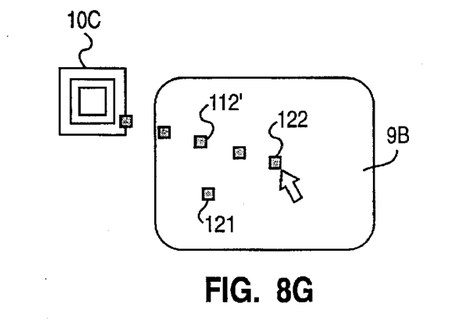
Figure 8H:
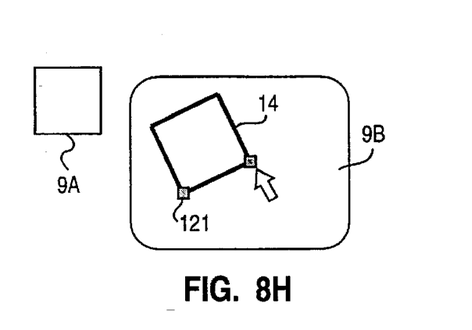

When a drawing point P1 on the graphical display screen 9B is specified by the mouse as shown in FIG. 8(C), this point serves as the starting point. Then, the point 111' that is the same as the control point 111 is moved in the form of animation, that is, blinked and moved from the starting control point 111 of the square icon 10C to point P1 (FIG. 8(D)). Finally, the control point 111 on the square icon 10C disappears, as shown in FIG. 8(E) and the drawing point P1 is displayed on the graphical display screen 9B. Through this display, it is visually clear that the starting point 111 of the square has already been specified and that the state for the next specification of the ending point corresponding to the control point 112 is ready. The control point to be next specified, that is, the ending point 112, is highlighted on the graphical icon 10C. When another drawing point P2 is successively specified on the graphical display screen 9B (FIG. 8(F)), this drawing point serves as the ending point of the square. Then, the point 112' that is the same as the second point (and in this case, the ending point) is moved from the square icon 10C to the drawing point P2, again in the form of animation, and the control point 12 of the graphic object is displayed (FIG. 8(G)). When both bottom ends of the square have finally been determined, a square 14 having P1–P2 as one side is drawn and the square icon 10C disappears (FIG. 8(H)). Then, the system returns to the non-operation state and the initial state appears on the screen.

Figure 9:
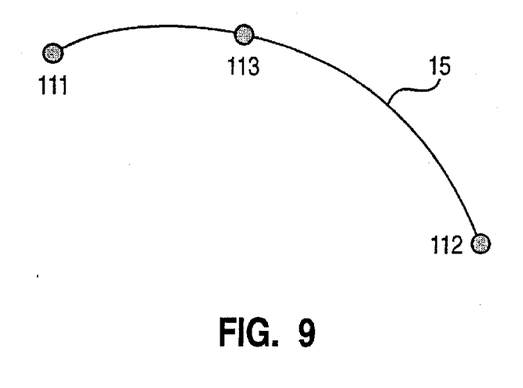
FIG. 9 shows the sequence for specifying the control points of a circular arc.
Figure 10A:
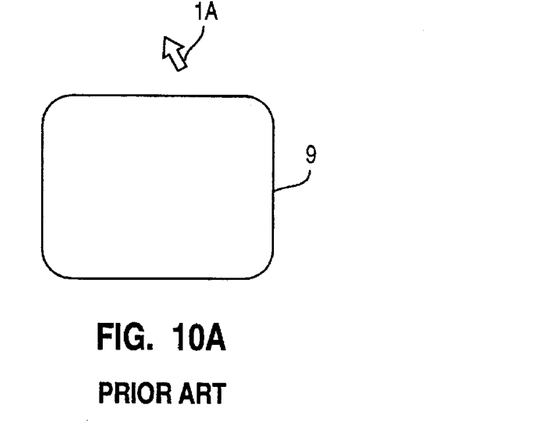
FIG. 10 shows the process for drawing a circular arc by the conventional method.
Figure 10B:
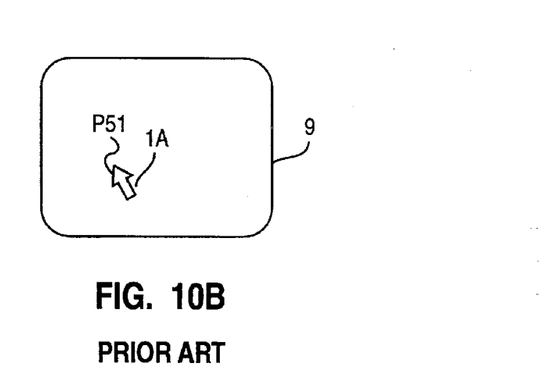
Figure 10C:
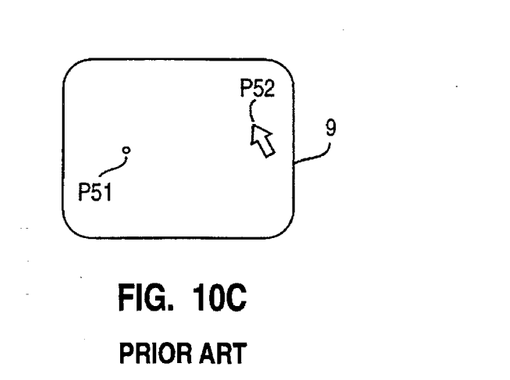
Figure 10D:
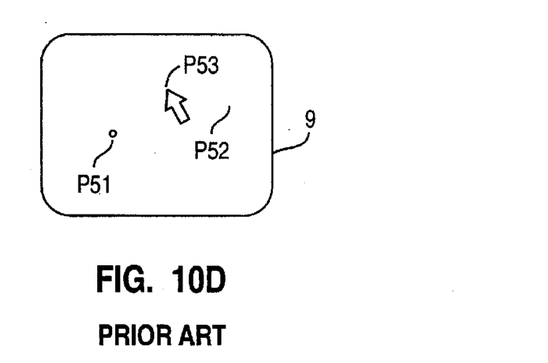
Figure 10E:
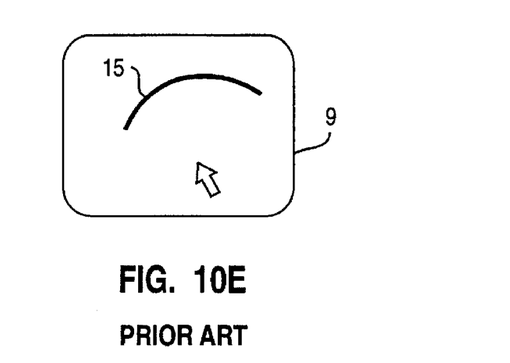
Figure 11A:
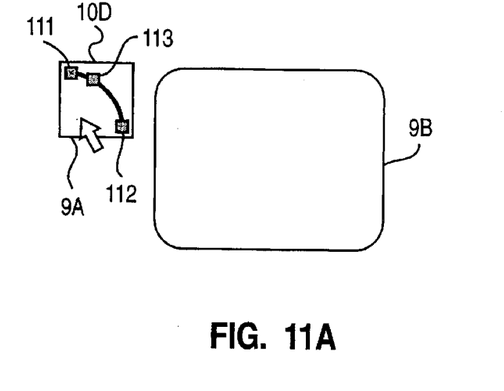
FIG. 11 shows the process for drawing a circular arc by the method of the present invention.
Figure 11B:
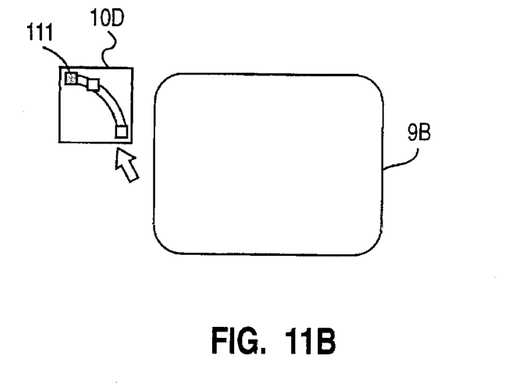
Figure 11C:
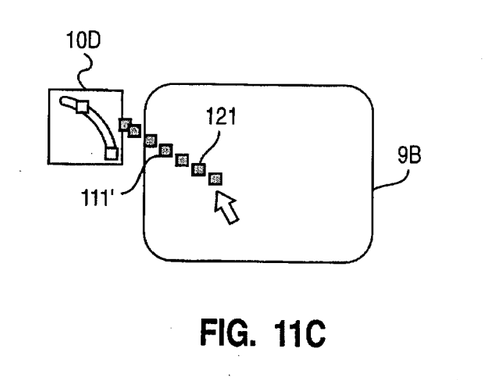
Figure 11D:
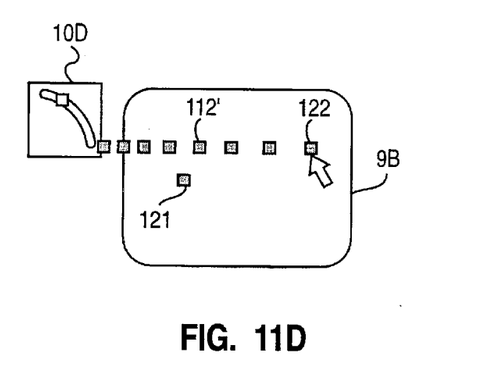
Figure 11E:
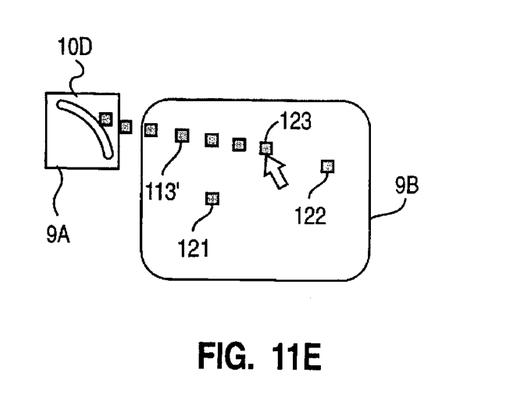
Figure 11F:
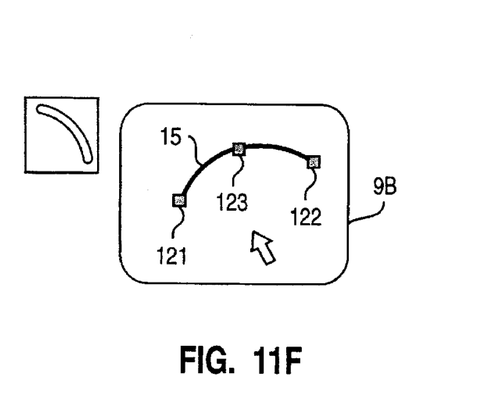

The present invention is very effective for drawing a complicated graphic consisting of a plurality of control points which must be specified in a special sequence. For the circular arc 15 in FIG. 9, for example, it is necessary to specify the control points in order of 111, 112, and 113. FIG. 10 shows the process for drawing a circular arc by the conventional method. FIG. 10(A) shows the initial state and FIGS. 10(B) through 10(D) show the states of successively specifying the drawing points P51 through P53. FIG. 10(E) shows the final state which is displayed when the drawing points have been properly specified. Unless the user is familiar with the operations, he or she will not be able to find which portions in which sequence he or she should specify in order to draw a circular arc. During drawing of the circular arc he or she also will not know the present step out of the processes (A) through (D).

FIG. 11 shows the case in which the same operation is executed with the apparatus of the present invention. Because at each step (A) through (F), the necessary information is visually displayed with icon 10D, control points (111 through 113 and 121 through 123), and animations (111' through 113'), the user will know the point to be specified next and the present step of the drawing process.

Figure 12:
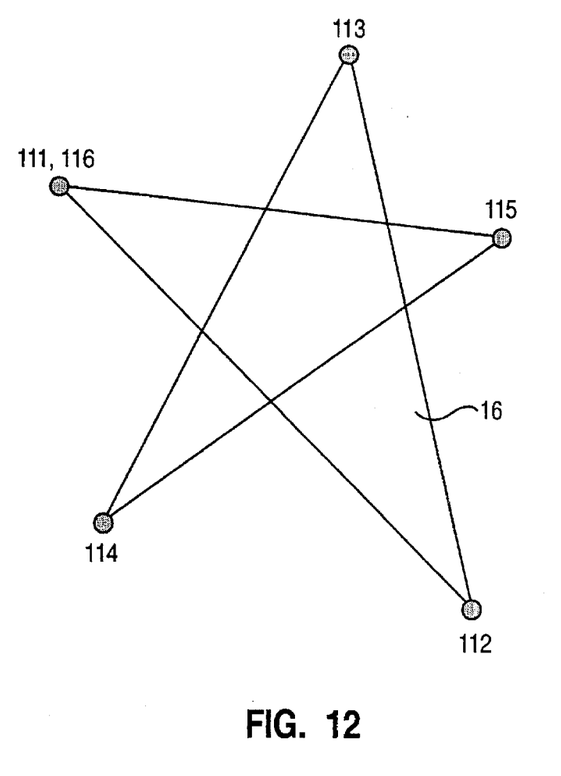
FIG. 12 shows the sequence for specifying the control points of a star.

The effect of the present invention becomes clearer when the number of control points increases to 5 or 6. For example, as shown in FIG. 12, six control points (111 through 116) are required to draw a star 16 and their specification sequence is complex. In an example of a conventional method, the present state is shown through words such as "Specify the starting point," but the starting point is not defined and the system must generate names to discriminate each point when the number of control points increases. Even if a number is adopted like "the n-th point", it is not clear at all which one of the control points that complicatedly constitutes the graphic that the number indicates.

The present invention makes it possible to display the control points and their specification sequence. Therefore, beginners can easily execute the operations.

Figure 13A:
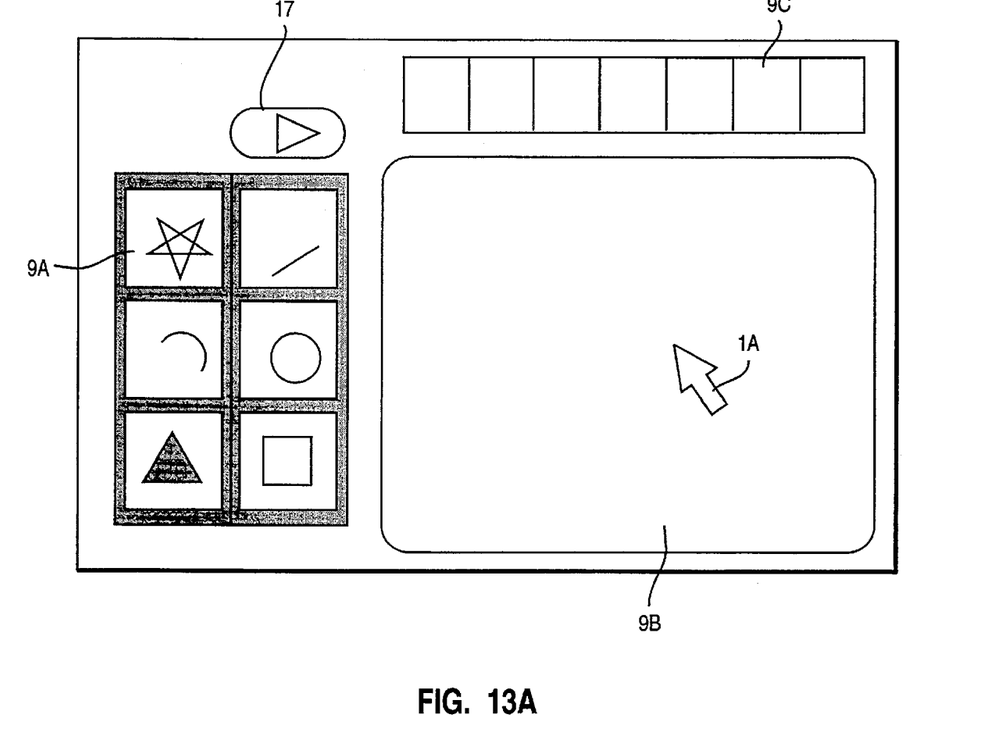
FIG. 13 shows another configuration of the display screen in FIG. 1.
Figure 13B:
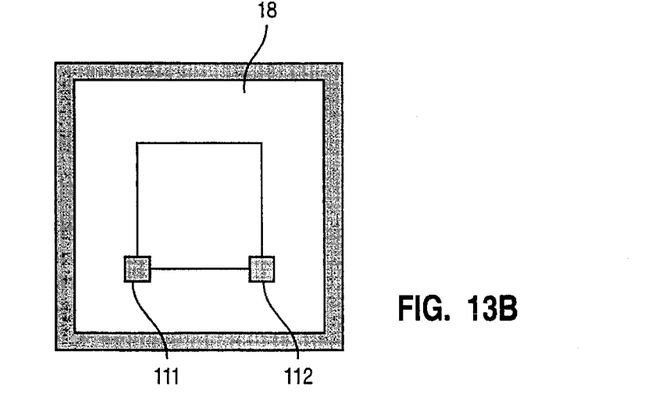

It is desirable to simultaneously display a plurality of graphical icons in the graphical icon menu area 9A in view of operability. However, it may be difficult to display a great many graphical icons together with their control points in a limited space. Therefore, as shown in FIG. 13, it is preferable to provide a button 17 for changing the display screen for graphical icon setting so that many graphical icons can be selected than can be displayed at one time. Especially when graphical icons having many control points are included, it is also preferable to display many graphical icons in the icon menu area 9A without using control points and then show an enlarged view 18 of the selected graphical icon 10 together with its control points 111 and 112 in the icon menu area 9A. It is also preferable to provide a means for teaching the user the operation sequence for the control points 111 and 112, in other words, a means for displaying numbers to indicate the operation sequence together with the control points by using an enlarged display instead of using the above animations.

Thus, the graphical drawing apparatus using graphical icons of the present invention allows the operator to easily find which portions in which sequence he should specify in order to draw a graphic having many control points. The invention also allows the operator to easily understand which control point he or she should specify when drawing a graphic with a mouse. Moreover, because animation is used, the way which the control points of the graphical icon correspond to those of the graphic actually drawn on a display screen is clear.

I claim:

1. A method for creating a graphic using graphical icons for defining a graphic in a graphical creating apparatus having an input means, a graphical processing means, and a display screen, the method comprising the steps of:

displaying a plurality of graphical icons on the display screen;

responsive to selection of a selected graphical icon of the plurality of graphical icons, displaying on the selected graphical icon on the display screen an operation sequence for a plurality of control points necessary for creating a graphic; and responsive to input of a plurality of drawing points, each corresponding to one of the plurality of control points, creating the graphic according to the plurality of drawing points.

2. The method as recited in claim 1, wherein in the display of the operation sequence for the plurality of the control points of the selected graphical icon, the plurality of control points of the selected graphical icon are highlighted in a predetermined sequence.

3. The method as recited in claim 2, wherein the plurality of control points are visually displayed on the display in the operation sequence for the plurality of control points of the selected graphical icon while continuously moving the control points from the selected graphical icon to the plurality of drawing points corresponding to the highlighted control points when the drawing points are specified on the display screen through the input means.

4. A method for creating a graphic using graphical icons for defining a graphic in a graphic creating apparatus having an input means, a graphical processing means, and a display screen, the method comprising the steps of:

displaying a plurality of graphical icons on the display screen;

responsive to the selection of a selected graphical icon of the plurality of graphical icons, displaying an enlarged version of the selected graphical icon and a plurality of control points in the selected graphical icon necessary for creating the graphic;

highlighting the plurality of control points in a predetermined sequence; and responsive to input of a plurality of drawing points, each corresponding to one of the plurality of control points, creating the graphic according to the plurality of drawing points.

5. A method for creating a graphic using graphical icons in a graphical creating apparatus having an input means, a storage means for storing graphical icons and data for sets of corresponding control points, a graphical processing means, and a display screen, the method comprising the steps of:

displaying a set of control points in a graphical icon menu area on the display screen on at least one selected graphical icon;

highlighting the set of control points on the selected graphical icon in a predetermined sequence;

visually displaying the set of control points while continuously moving each control point from the graphical icon menu area to a set of graphic drawing points, each corresponding to a respective highlighted control point, when the graphic drawing points are specified in a drawing area on the display screen through the input means; and, displaying the graphic corresponding to the selected graphical icon in the drawing area on the display screen when the set of the drawing points have all been specified.

6. A graphical creating apparatus using graphical icons for defining a graphic, comprising:

a storage means for storing a set of graphics, a plurality of graphical icons and a set of corresponding data for a plurality of control points necessary for creating each graphic, wherein each graphic corresponds to one of a plurality of graphical icons;

a means for displaying the plurality of graphical icons on the display screen;

a means for displaying a plurality of control points in an operation sequence on a selected graphical icon of the plurality of graphical icons; and     means responsive to input of a plurality of drawing points, each corresponding to one of the plurality of control points, for creating the graphic according to the plurality of drawing points.

7. The graphical creating apparatus as recited in claim 6, wherein the means for displaying the operation sequence on the selected graphical icon highlights the plurality of control points on the selected graphical icon in a predetermined sequence.

8. The graphical creating apparatus as recited in claim 7, wherein the means for displaying the operation sequence for the plurality of control points of the graphical icons includes a control point moving and displaying means for visually displaying the plurality of control points while continuously moving them from the selected graphical icon to a set of drawing points corresponding to the highlighted control points when the drawing points are specified on the display screen through the input means.

9. The graphical creating apparatus as recited in claim 6, wherein the means for displaying the operation sequence for the plurality of control points of the selected graphical icon includes a means for enlarging the selected graphical icon on the display screen together with the plurality of control points for creating the graphic and a means for highlighting the plurality of control points of the selected graphical icon in a predetermined sequence.

10. A graphical creating apparatus having a graphical processing means for executing processing in accordance with a set of operation commands and data imputed through a mouse operation and a means for creating a graphic on a display screen in accordance with the graphic processing means, the apparatus comprising:

a graphical icon table for storing a plurality of graphical icons for defining a plurality of graphics and a plurality of control points necessary for creating the plurality of graphics;

a means for displaying the plurality of graphical icons in a graphical icon menu area on the display screen;

a means for highlighting a set of control points on one graphical icon selected through the mouse in a predetermined sequence;

a graphical object table for recording data for a set of drawing points of a graphic when the drawing points of the graphic corresponding to the control points of the selected graphical icon are specified in a drawing area on the display screen through the mouse;

a point moving and displaying means for displaying highlighted points while continuously moving the highlighted points from the control points in the graphical icon to the drawing points when the drawing points corresponding to the control points are specified; and     a means for displaying the graphic corresponding to the selected graphical icon in the drawing area by the drawing means when all the drawing points corresponding to the control points of the selected graphical icon are specified.

11. The graphical creating apparatus as recited in claim 10 wherein the point moving and displaying means divides up a distance between the control points of the graphical icon and corresponding drawing points prior to moving the highlighted points from control points to drawing points.

* * * * *